3,420,877
PROCESS FOR THE PREPARATION OF FLUO-ROCARBON SULFINATES AND DERIVATIVES THEREOF

Frank J. Pavlik, St. Paul, Minn., assignor to Minnesota Mining and Manufacturing Company, St. Paul, Minn., a corporation of Delaware
No Drawing. Continuation-in-part of application Ser. No. 159,153, Dec. 13, 1961. This application October 23, 1965, Ser. No. 504,219
U.S. Cl. 260—513.7                8 Claims
Int. Cl. C07c *145/00*

This invention relates to a process for the preparation of fluorocarbon sulfinates and corresponding sulfonyl halides.

This application is a continuation-in-part of United States Ser. No. 159,153, filed on Dec. 13, 1961, and now abandoned.

Fluorocarbon sulfonyl chlorides have been heretofore made by a multiple step process by hydrolyzing fluorocarbon sulfonyl fluorides with strong alkali at high temperatures to form the corresponding sulfonic acid salt, isolating the salt and reacting it with phosphorous pentachloride or with phosphorus pentachloride and zinc chloride at high temperatures to form the desired fluorocarbon sulfonyl chloride. The high temperatures involved, tne necessity for isolation of intermediates, problems in handling the phosphorus pentachloride, and foaming tendencies of the reactant mixtures combined to make the process cumbersome and undesirable for use on a commercial scale.

An improved method was developed in which the fluorocarbon sulfonyl fluoride was reacted with hydrazine in an inert solvent and the resulting hydrazide intermediate was reacted with chlorine to produce the desired fluorocarbon sulfonyl chloride. However, hydrazine is both expensive and very toxic. In addition, the reaction produces large quantities of liberated nitrogen and hydrogen chloride gases, as well as some hydrogen fluoride, and relatively large quantities of chlorine reactant are required.

It is an object of this invention to provide a process for the preparation of fluorocarbon sulfinates and derivatives thereof.

It is therefore an object of this invention to provide an improved process for the preparation of fluorocarbon sulfonyl halide, particularly the bromide and chloride.

Another object of this invention is to provide a more efficient and economical method for preparing fluorocarbon sulfonyl halide.

Still another object is to provide a method for preparing fluorocarbon sulfinates without excessive foaming.

According to this invention an improved process for preparing fluorocarbon sulfonyl halides is provided by reacting a fluorocarbon sulfonyl fluoride with an alkaline sulfite in an aqueous medium, preferably in an aqueous medium containing from about 10 to about 50 weight percent of a water soluble, inert organic solvent, to produce a fluorocarbon sulfinic acid salt, and then reacting said salt with a halogen such as chlorine or bromine under aqueous or nonaqueous conditions and recovering the fluorocarbon sulfonyl halide product.

The fluorocarbon sulfonyl fluoride starting materials are readily available from the electrochemical fluorination process as described by Brice et al. in U.S. Patent 2,732,398. These fluorocarbon sulfonyl fluorides may be represented by the formula $$R_fSO_2F$$

wherein $R_f$ is a saturated fluorocarbon radical containing from 1 to 18 carbon atoms and is preferably a perfluoroaliphatic group having an open (acyclic) straight or branched chain or a cyclic structure (e.g., a perfluorocyclohexyl group having a six membered ring), including a combination of perfluoroalkyl straight chain and perfluorohomocyclic or perfluoroheterocyclic groups. The fluorocarbon group may be bonded to the sulfur atom through either a cyclic or an acyclic carbon atom, and two carbon atoms of the fluorocarbon group may be linked together by an oxygen atom or three carbon atoms may be linked together by a nitrogen atom, since both oxygen and nitrogen provide stable linkages between fluorocarbon groups and do not interfere with the highly stable and inert character of the complete fluorocarbon group or structure, as is shown, for instance, in U.S. Patents Nos. 2,500,388 and 2,616,927. As used herein, "perfluoroaliphatic" therefore includes perfluoro straight or branched chain (i.e., perfluoroalkyl), perfluorocycloaliphatic, and perfluoroalkyl-perfluorocycloaliphatic radicals.

Illustrative of the fluorocarbon sulfonyl fluoride reactants are the following: perfluoroethane sulfonyl fluoride, perfluoro-n-pentane sulfonyl fluoride, trifluoromethane sulfonyl fluoride, perfluoro-n-hexane sulfonyl fluoride, perfluoro-n-octane sulfonyl fluoride, perfluoro (cyclohexylmethane)sulfonyl fluoride, perfluoro(4-methylcyclohexane)sulfonyl fluoride, perfluorocyclohexane sulfonyl fluoride, perfluoro(2-methylcyclohexane)sulfonyl fluoride, perfluoro(4-ethylcyclohexane)sulfonyl fluoride, perfluoro(4-isopropylcyclohexane)sulfonyl fluoride, perfluoro(4-sec-butylcyclohexane)sulfonyl fluoride, perfluoro(4-dodecylcyclohexane)sulfonyl fluoride, and perfluoro(cyclohexylethane)sulfonyl fluoride. The fluorocarbon sulfonyl fluoride reactants of this invention are considerably less reactive than the hydrocarbon sulfonyl fluorides, although the intermediate fluorocarbon sulfinates, i.e., sulfinic acid salts, are less stable than hydrocarbon alkyl and aryl sulfinates.

The alkaline sulfites which can be reacted with the fluorocarbon sulfonyl fluorides are preferably the alkali metal and alkaline earth metal sulfites, particularly sodium and potassium sulfite. An excess of the inorganic sulfite is preferably used, e.g., 3:1 molar ratio of sodium sulfite to fluorocarbon sulfonyl fluoride.

The reaction may be described as follows:

$$R_fSO_2F + 2Na_2SO_3 \xrightarrow{75°\,C.-120°\,C.} R_fSO_2Na + Na_2SO_4 + NaF + SO_2$$

Although the reaction may be conducted in an aqueous medium, foaming frequently occurs during the reaction, even under elevated pressure conditions and particularly at the higher reaction temperatures. It has been found that the presence of at least one water soluble, polar organic solvent which contains no active hydrogen atoms and which is inert to both the products and the reactants, reduces and virtually eliminates the foaming tendency which makes product separation and recovery difficult and which reduces the yield. These solvents, which must be water soluble within the indicated range under the reaction conditions of temperature, etc. include, for example, cyclic ethers (e.g., dioxane), dimethyl formamide, dimethoxyethane, di-n-butyl ether, tetrahydrofuran, diethylene glycol diethyl ether, acetonitrile, etc., and have boiling points below 110° C., preferably below 85° C., at 10 mm. mercury pressure. The most preferred organic solvents are those in which the sulfinate product is more soluble in an admixture of organic solvent and water than in water alone at the same temperature. Use of from about 10 to about 50 weight percent of these solvents in the aqueous reaction medium also promotes completion of the reaction in a shorter time and at a lower temperature. The reaction is carried out at moderate temperatures, preferably from 75° C. to 120° C. and usually from 80° C. to 95° C. Significantly higher temperatures may cause decomposition of the thermally unstable sulfinate product. When the organic solvent used boils below about 80° C. at atmospheric pressure, the reaction is preferably conducted under elevated pressure, e.g., autogenous pressure. Completion of the reaction is indicated by cessation of sulfur dioxide liberation.

After separation of the highly surface-active fluorocarbon sulfinic acid salt, such as by isopropanol extraction and subsequent evaporation of solvent, the sulfinic acid salt may be reacted with halogen, e.g., chlorine, bromine, etc., in either an aqueous or nonaqueous medium. Before halogenation the sulfinic acid salt may be added directly to water or may be taken up in an inorganic acid solution, e.g. 5 weight percent aqueous solution of hydrochloric acid. The halogenation is preferably effected at moderate temperatures of from about −5° C. to 30° C., since the reaction is somewhat more difficult to control at the higher temperatures.

It will be observed that the process herein described is readily conducted in high yields without extreme temperatures or extreme pressures and without liberation of hydrogen fluoride, thus permitting the use of conventional glass lined equipment in commercial production. Furthermore, the process incurs considerable economics in raw materials, as evidenced by the use of relatively inexpensive inorganic sulfites. No sulfonic acid intermediates are employed.

Generally, when the fluorocarbon group of the sulfonyl halides (other than fluoride) produced in the process of this invention contains five or more carbon atoms it is effectively repellent not only to water but also to oils and hydrocarbons and consequently imparts unique surface active properties not possessed by corresponding hydrocarbon compounds. These fluorocarbon sulfonyl halide products are particularly useful as chemical intermediates in the preparation of other valuable fluorocarbon compounds. They may, for example, be reacted with ethylenically unsaturated compounds to form a wide variety of products which are particularly useful, because of their characteristic fluorocarbon surface active properties, e.g., as emulsifying agents, and for preparation of surface coatings and treatments, etc., as described in the Brown United States Patent No. 2,950,317.

The following examples will serve to illustrate this invention.

EXAMPLE 1

Into a three-necked flask equipped with stirrer, reflux condenser and thermometer were charged 0.4 mol of perfluorobutanesulfonyl fluoride, 1.2 mole of sodium sulfite and 200 grams of 25 percent aqueous dioxane. No foam formation was noted during the four hour heating period at 75–80° C. The mixture was then cooled and extracted with isopropyl alcohol. The extract of sulfinate, water, alcohol and dioxane was evaporated to dryness under vacuum, then was taken up in 5 weight percent hydrochloric acid. Chlorine gas was passed into the mixture with stirring. A 55 percent yield of perfluorobutanesulfonyl chloride (B.P. 100.5–103.0° C.) was recovered.

EXAMPLE 2

To 201 grams (0.4 mol) of perfluorooctanesulfonyl fluoride in a three-necked flask were added 152 grams (1.2 mols) of sodium sulfite, 50 grams of dioxane and 150 grams of water. The mixture was heated for 5 hours at 85–87° C. while a slow stream of nitrogen gas was bubbled through the reaction mixture. No foaming was observed. The product was recovered by adding 600 ml. of isopropyl alcohol, warming to 70° C., then filtering and re-extracting the precipitate twice with additional portions of hot isopropyl alcohol. The isopropyl alcohol, water and dioxane were removed in vacuo from the sodium perfluorooctane sulfinate (85% yield).

Reaction of the above product, as in Example 1, with chlorine gas produced the perfluorooctane sulfonyl chloride. Bromination with bromine in carbon tetrachloride produced the perfluorooctane sulfonyl bromide in the following manner:

To 70 grams of sodium perfluorooctane sulfinate in 30 ml. of carbon tetrachloride were added 21 grams of bromine dropwise at room temperature until no further bromine reaction was observed. The reaction mixture was then filtered and the carbon tetrachloride removed by distillation. The residue was recrystallized from dichloromethane to give 44 grams of perfluorooctanesulfonyl bromide (48% yield, M.P. 40–42° C.).

EXAMPLE 3

Fifty grams of perfluorooctane sulfonyl fluoride, 25 ml. of dimethyl formamide, 75 grams of water and 38 grams of sodium sulfite were mixed with stirring and heated for 3½ hours at 95° C. Isopropyl alcohol was used to precipitate the inorganic salts. Evaporation of the isopropyl alcohol soluble solids produced 45 grams of sodium perfluorooctane sulfinate. Chlorination of 10 grams of this sulfinate, as in Example 1, resulted in the production of 3.3 grams of perfluorooctane sulfonyl chloride.

EXAMPLE 4

To 78 grams (0.155 mol) of perfluorooctanesulfonyl fluoride, in a three-necked flask, were added 25 grams of acetonitrile, 59 grams of sodium sulfite and 75 grams of water. The mixture was heated and stirred for 3½ hours at 77° C. Inorganic salts were precipitated with isopropyl alcohol, and the alcohol solution was evaporated to yield 64 grams (0.127 mol) of sodium perfluorooctanesulfinate (82% yield). Chlorination of 10 grams (.019 mol) of this product produced 6 grams of perfluorooctanesulfonyl chloride.

EXAMPLE 5

To a three-necked flask equipped with thermometer, condenser and stirrer were charged 25 ml. of 1,2-dimethoxyethane, 100 ml. of water, 38 grams (0.3 mol) of sodium sulfite and 50 grams of perfluorooctanesulfonyl fluoride. The mixture was stirred at 81° C. for 4 hours without any evidence of foaming. The contents of the flask were dried to a solid, then granulated and extracted with isopropyl alcohol. Forty-one grams of sodium perfluorooctanesulfinate were obtained. Chlorination of 10 grams of this product in 5 weight percent aqueous hydrochloric acid produced 5.4 grams of perfluorooctanesulfonyl chloride.

EXAMPLE 6

To 50.5 grams of perfluorooctanesulfonyl fluoride in a rocking autoclave were added 37.8 grams of sodium sulfite, 25 ml. of tetrahydrofuran and 75 ml. of water. The mixture was maintained under autogenous pressure at 110° C. for 2½ hours. Forty-six grams of sulfinate were produced (91% yield). Chlorination of 10 grams gave 7.2 grams of perfluorooctanesulfonyl chloride.

When the same procedure was followed without the tetrahydrofuran, severe foaming resulted and a 59% yield of sulfinate was recovered.

In the foregoing examples, with the use of nonpolar solvents which are not miscible with water, such as heptane and toluene, severe foaming and low yield was observed. Solvents containing active hydrogen atoms, such as alcohols, acetamide, mercaptans, acetic acids, etc., are also not suitable for use in the process of this invention.

Various other embodiments of this invention will be apparent from the foregoing disclosure to those skilled in the art without departing from the scope thereof.

I claim:

1. A process which comprises reacting an alkali metal sulfite or an alkaline earth metal sulfite in an aqueous medium containing from about 10 to about 50 weight percent of a dissolved polar, inert organic solvent selected from the group consisting of dioxane, dimethoxyethane, di-n-butyl ether, tetrahydrofuran, and diethylene glycol diethyl ether with a compound of the formula $$R_fSO_2F$$

wherein $R_f$ is a perfluoroaliphatic radical having from 1 to about 18 carbon atoms, thereby producing a perfluoroaliphatic sulfinate.

2. The process of claim 1 in which said perfluoroaliphatic sulfinate is subsequently chlorinated with gaseous chlorine to produce a perfluoroaliphatic sulfonyl chloride.

3. The process of claim 1 in which said perfluoroaliphatic sulfinate is subsequently brominated with bromine to produce a perfluoroaliphatic sulfonyl bromide.

4. The process of claim 1 wherein said organic solvent is dioxane.

5. The process of claim 1 wherein said organic solvent is dimethoxyethane.

6. The process of claim 1 wherein said organic solvent is tetrahydrofuran.

7. The process of claim 1 wherein said organic solvent is diethylene glycol diethyl ether.

8. The process of claim 1 in which $R_f$ is a perfluoroalkyl radical.

References Cited

UNITED STATES PATENTS 2,776,992   1/1957   Gregory _____ 260—500
3,170,954   2/1965   Rosenberg _____ 260—513.7

FOREIGN PATENTS 124,407   10/1901   Germany.

OTHER REFERENCES

Kulka: "Jour. Am. Chem. Soc.," vol. 72, pp. 1215–1218 (1950).

Schwartz et al.: "Surface Active Agents and Detergents," vol. II, pp. 456–457 (1958).

Merck Index, seventh ed., pp. 8, 353, 367, 371, 378 and 1023.

Houben-Weyl: "Methoden der Organischen Chemie," vol. IX, pp. 583–584 (1955).

LEON ZITVER, *Primary Examiner.*

J. E. EVANS, *Assistant Examiner.*

U.S. Cl. X.R.

260—543